United States Patent
Faller et al.

(10) Patent No.: US 11,836,987 B2
(45) Date of Patent: Dec. 5, 2023

(54) FUSION SYSTEM FOR FUSING ENVIRONMENT INFORMATION FOR A MOTOR VEHICLE

(71) Applicant: Bayerische Motoren Werke Aktiengesellschaft, Munich (DE)

(72) Inventors: Rainer Faller, Munich (DE); Jelena Frtunikj, Munich (DE); Hans-Ulrich Michel, Mallersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 541 days.

(21) Appl. No.: 17/046,041

(22) PCT Filed: Apr. 2, 2019

(86) PCT No.: PCT/DE2019/100303
§ 371 (c)(1),
(2) Date: Oct. 8, 2020

(87) PCT Pub. No.: WO2019/196986
PCT Pub. Date: Oct. 17, 2019

(65) Prior Publication Data
US 2021/0370959 A1    Dec. 2, 2021

(30) Foreign Application Priority Data
Apr. 9, 2018    (DE) ...................... 10 2018 205 248.4

(51) Int. Cl.
*G06V 20/58*    (2022.01)
*B60R 16/023*    (2006.01)
(Continued)

(52) U.S. Cl.
CPC .......... *G06V 20/58* (2022.01); *B60R 16/0231* (2013.01); *B60W 50/0098* (2013.01);
(Continued)

(58) Field of Classification Search
CPC .... G06V 20/58; G06V 10/454; G06V 10/803; B60R 16/0231; B60W 50/0098; B60W 2050/0043; G06F 18/251; G06N 3/04
See application file for complete search history.

(56) References Cited

U.S. PATENT DOCUMENTS 5,247,584 A    9/1993   Krogmann
2015/0344028 A1*  12/2015  Gieseke .............. B60W 30/095
                                              348/148
(Continued)

FOREIGN PATENT DOCUMENTS

DE           41 00 500 A1    7/1992
DE       10 2007 002 562 A1   7/2008
(Continued)

OTHER PUBLICATIONS

International Search Report (PCT/ISA/210) issued in PCT Application No. PCT/DE2019/100303 dated Jul. 18, 2019 with English translation (four (4) pages).
(Continued)

*Primary Examiner* — Behrang Badii
(74) *Attorney, Agent, or Firm* — Crowell & Moring LLP

(57) ABSTRACT

A fusion system for a motor vehicle includes at least two environment sensors, a neural network coupled to the environment sensors for fusing environment information from the environment sensors, a fusion apparatus for fusing environment information from the environment sensors, and a control device coupled to the neural network and the fusion apparatus. The control device is set up to adapt the environment information fused via the neural network, depending on the environment information fused by the fusion apparatus, and to provide the adapted environment information to a driver assistance system of the motor vehicle.

9 Claims, 2 Drawing Sheets

(51) Int. Cl.
B60W 50/00 (2006.01)
G06V 10/80 (2022.01)
G06V 10/44 (2022.01)

(52) U.S. Cl.
CPC .......... G06V 10/454 (2022.01); G06V 10/803 (2022.01); *B60W 2050/0043* (2013.01)

(56) References Cited

U.S. PATENT DOCUMENTS

| | | | |
|---|---|---|---|
| 2017/0080950 A1 | 3/2017 | Pink et al. | |
| 2017/0206464 A1 | 7/2017 | Clayton et al. | |
| 2019/0026597 A1* | 1/2019 | Zeng | G05D 1/0274 |
| 2019/0173196 A1* | 6/2019 | Achour | H01Q 15/0086 |
| 2020/0025935 A1* | 1/2020 | Liang | G06V 20/64 |

FOREIGN PATENT DOCUMENTS

| | | |
|---|---|---|
| DE | 10 2009 006 113 A1 | 9/2009 |
| DE | 10 2014 205 180 A1 | 9/2015 |
| DE | 10 2015 210 881 A1 | 12/2016 |
| DE | 10 2017 006 599 A1 | 3/2018 |
| JP | 2009-282783 A | 12/2009 |
| JP | 2017-513162 A | 5/2017 |
| WO | WO 2017/122784 A1 | 7/2017 |

OTHER PUBLICATIONS

German-language Written Opinion (PCT/ISA/237) issued in PCT Application No. PCT/DE2019/100303 dated Jul. 18, 2019 (six (6) pages).
German-language Search Report issued in German Application No. 10 2018 205 248.4 dated May 28, 2019 with English translation (11 pages).
BAST., "Rechtsfolgen zunehmender Fahrzeugautomatisierung", Forschung kompakt, Retrieved from www.bast.de/DE/Publikationen/Foko/Downloads/2012-11.pdf? blob =publicationFile&v=1, with English abstract, (two (2) pages).
Suhr B., "Surface Vehicle Recommended Practice", SAE International, Jun. 9, 2017, pp. 1-30, (30 pages).
Japanese-language Office Action issued in Japanese Application No. 2020-552277 dated Oct. 12, 2022, with English translation (six (6) pages).
Korean-language Office Action issued in Korean Application No. 10-2020-7025411 dated Apr. 14, 2022 with English translation (seven (7) pages).

* cited by examiner

FUSION SYSTEM FOR FUSING ENVIRONMENT INFORMATION FOR A MOTOR VEHICLE

BACKGROUND AND SUMMARY OF THE INVENTION

The invention relates to a fusion system for fusing environment information of a motor vehicle.

The term "automated driving" in the context of the document may be understood to mean driving with automated longitudinal or transverse guidance or autonomous driving with automated longitudinal and transverse guidance. The term "automated driving" comprises automated driving with any degree of automation. Exemplary degrees of automation are assisted, partly automated, highly automated or fully automated driving. These degrees of automation have been defined by the German Federal Highway Research Institute (BASt) (see BASt publication "Forschung kompakt" [Compact research], issued November 2012). In the case of assisted driving, the driver continuously performs longitudinal or transverse guidance while the system takes over the respective other function within certain limits. In the case of partly automated driving (TAF), the system takes over the longitudinal and transverse guidance for a certain duration and/or in specific situations, wherein the driver has to continuously monitor the system as in the case of assisted driving. In the case of highly automated driving (HAF), the system takes over the longitudinal and transverse guidance for a certain duration without the driver having to continuously monitor the system; the driver must however be capable within a certain time of taking over vehicle guidance. In the case of fully automated driving (VAF), the system is able to automatically manage driving in all situations for a specific application case; a driver is then no longer required for this application case. The four degrees of automation mentioned above in accordance with the definition of the BASt correspond to SAE Levels 1 to 4 of the SAE J3016 standard (SAE—Society of Automotive Engineering). By way of example, highly automated driving (HAF) according to the BASt corresponds to Level 3 of the SAE J3016 standard. SAE J3016 furthermore also provides SAE Level 5 as the highest degree of automation, this not being contained in the definition of the BASt. SAE Level 5 corresponds to driverless driving, in which the system is able to automatically manage all situations in the same way as a human driver throughout the entire journey; a driver is then generally no longer required.

One object of the invention is to specify an improved fusion system for fusing environment information of a motor vehicle.

The object is achieved by the features of the independent patent claims. Advantageous embodiments are described in the dependent claims. It is pointed out that additional features of a patent claim dependent on an independent patent claim, without the features of the independent patent claim or only in combination with a subset of the features of the independent patent claim, may form a separate invention independent of the combination of all of the features of the independent patent claim, that may be made into the subject matter of an independent claim, a divisional application or a subsequent application. This applies analogously to the technical teaching described in the description, which teaching may form an invention independent of the features of the independent patent claims.

A first aspect of the invention relates to a fusion system for a motor vehicle.

The fusion system in this case comprises at least two environment sensors and a neural network coupled to the environment sensors for fusing environment information from the environment sensors.

A neural network, which is often also referred to as an artificial neural network, is a network consisting of artificial neurons. The neurons are in this case usually divided into layers and are connected to one another.

The fusion system furthermore comprises a fusion apparatus for fusing environment information from the environment sensors. This is, in this case, in particular a fusion apparatus that is configured so as to receive a circumstance variable that is characteristic of a circumstance relating to the driving situation.

The fusion apparatus is, in this case, in particular configured so as to determine at least one influencing variable characteristic of an influence of an environment sensor on the fusion on the basis of the circumstance variable.

The fusion apparatus is furthermore in particular configured so as to fuse environment information from the environment sensors on the basis of the influencing variable.

The fusion system furthermore comprises a control device coupled to the fusion apparatus and to the neural network. The control device is in this case configured so as to adapt the environment information fused by the neural network on the basis of environment information fused by the fusion apparatus, and to provide the adapted environment information to a driver assistance system of the motor vehicle.

By way of example, the control device may make a selection, on the basis of the environment information fused by the fusion apparatus, as to whether the environment information fused by the neural network or the environment information fused by the fusion apparatus is provided to the driver assistance system.

As an alternative thereto, the control device may interpret the environment information fused by the neural network on the basis of the environment information fused by the fusion apparatus and provide the interpretation result to the driver assistance system.

If for example the fused environment information in each case relates to a spatial region in which an object is located with a sufficiently high probability, then the control device may combine the two spatial regions with one another and provide the combination result to the driver assistance system.

The invention is in this case based on the finding that, although the fusion apparatus may for example output fuzzier fused environment information with a higher variance, this possibly covers the actual location of the object with a relatively high probability. By contrast, the neural network may for example output sharp fused environment information with a low variance, but this may possibly cover the actual location of the object with a comparatively lower probability.

In this case, the control device could for example provide a portion of the environment information fused by the neural network and of the environment information fused by the fusion apparatus to the driver assistance system.

In one advantageous embodiment, the fusion system comprises a recording device coupled to the fusion apparatus.

The recording device is in this case configured so as to store, for linked environment information provided by the fusion apparatus, at least one circumstance variable that is characteristic of a circumstance relating to the driving situation and/or at least one influencing variable determined on the basis of the circumstance variable and characteristic of an influence of an environment sensor on the fusion.

In this case, the invention is based on the finding that a neural network is often referred to as a "black box" due to its comparatively large state space. By linking the neural network to the fusion apparatus, the calculation result of the fusion system is however able to be understood deterministically, since it moves in particular in the framework set by the fusion apparatus.

In a further advantageous embodiment, the fusion system comprises a fusion apparatus for fusing environment information from at least two environment sensors of a motor vehicle.

The environment sensors may be for example camera, radar, lidar or ultrasound sensors.

The fusion apparatus is in this case configured so as to receive a circumstance variable that is characteristic of a circumstance relating to the driving situation.

The circumstance variable is in particular a variable characteristic of the context of the motor vehicle. By way of example, the circumstance variable is a variable characteristic of the light intensity of ambient light (for example brightness value or binary value "light"/"dark"). As an alternative, the circumstance variable may also for example be a variable characteristic of the time, or be the time itself. As an alternative, the circumstance variable may be for example a detection target for the fusion of the environment information (occupation detection or availability detection). As an alternative, the circumstance variable may be for example a variable characteristic of the weather. As an alternative, the circumstance variable may be for example a variable characteristic of the position of the motor vehicle, wherein both an absolute position (for example specified by coordinates) or a traffic situation may be valid as a position.

The circumstance variable is conveyed to the fusion apparatus in this case in particular by a device that differs from the environment sensors. By way of example, this may in this case be a sensor or a controller.

The fusion apparatus is additionally configured so as to determine at least one influencing variable characteristic of an influence of an environment sensor on the fusion on the basis of the circumstance variable.

The influencing variable is in this case in particular a weighting factor assigned to an environment sensor and that specifies the influence of the environment sensor in a linear combination of at least two environment sensors.

The fusion apparatus is furthermore configured so as to fuse environment information from the environment sensors on the basis of the influencing variable and to provide the fused environment information to a driver assistance system contained within the motor vehicle.

The driver assistance system may be for example a driver assistance system for longitudinal and/or transverse guidance.

In one advantageous embodiment, the fusion apparatus is configured so as to determine the influencing variable on the basis of a relationship between the circumstance variable and a functional quality of at least one environment sensor.

The fusion apparatus is in this case in particular configured so as to take into account the operation of an environment sensor when determining the fusion quality. This may be performed for example as early as during the development of the fusion apparatus.

By way of example, the influence of a camera sensor on the fusion may be set to be comparatively low if the circumstance variable specifies that the light conditions in the environment of the motor vehicle are comparatively poor. On the other hand, the influence of a camera sensor on the fusion may be set to be comparatively large if the circumstance variable specifies that the light conditions in the environment of the motor vehicle are comparatively good.

In a further advantageous embodiment, the fusion apparatus is configured so as to interpret the fused environment information before providing it to the driver assistance system on the basis of an assistive variable.

The assistive variable and the interpretation of the fused environment information may in this case be defined in particular on the basis of a priori knowledge.

The fusion apparatus is in this case in particular configured so as to interpret the fused environment information as an assistive variable on the basis of a movement of an object recorded by the environment sensors.

By way of example, it is possible to use the past direction of movement and speed of movement of the object on the basis of physical motion equations to conclude as to where the object will be located at a future time.

This knowledge may in this case be used in order to interpret the fused environment information. If for example the fused environment information involves a spatial region in which the object is located with a sufficiently high probability, then this spatial region may be interpreted and thus made more precise by taking into account the kinematics of the object, that is to say the past direction of movement and speed of movement of the object.

As an alternative or in addition, the fusion apparatus is configured in particular so as to interpret the fused environment information as an assistive variable on the basis of a behavioral model of an object recorded by the environment sensors.

The behavioral model may in this case for example be determined empirically and be stored in the fusion apparatus as a parameter of a filter, for instance of a Kalman filter.

The behavioral model may in this case for example specify the probability of the object changing its direction of movement. If the object is a traffic participant, then the behavioral model may also specify the probability of the traffic participant changing lane or turning off with or without using a direction of travel indicator.

As an alternative or in addition, the fusion apparatus is in particular configured so as to interpret the fused environment information as an assistive variable on the basis of a traffic rule.

In particular if the object is a traffic participant, a traffic rule on the lane in which the traffic participant is located may give a strong indication as to whether the traffic participant will change its speed of movement or direction of movement.

This knowledge may likewise be used in order to interpret the fused environment information such that the fused environment information is made more precise.

A further concept of the invention relates to a method for fusing environment information from at least two environment sensors of a motor vehicle.

One step of the method is receiving a circumstance variable that is characteristic of a circumstance relating to the driving situation.

A further step of the method is determining at least one influencing variable characteristic of an influence of an environment sensor on the fusion on the basis of the circumstance variable.

A further step of the method is fusing the environment information from the environment sensors on the basis of the influencing variable.

A final step of the method is providing the fused environment information.

The above explanations regarding the fusion apparatus according to the invention according to the first aspect of the invention also apply analogously to the method according to the invention according to the second aspect of the invention. Advantageous exemplary embodiments of the method according to the invention that are not explicitly described here and in the patent claims correspond to the advantageous exemplary embodiments of the fusion apparatus according to the invention described above or described in the patent claims.

The invention is described below on the basis of an exemplary embodiment with the assistance of the appended drawings.

DETAILED DESCRIPTION OF THE DRAWINGS

Figure 1A:
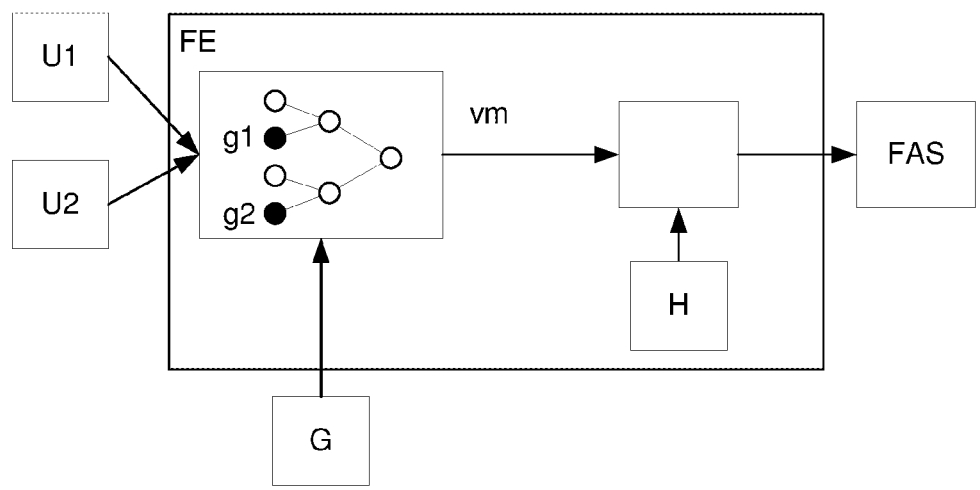
FIG. 1a shows an exemplary embodiment of a fusion apparatus according to the invention.

FIG. 1a shows a fusion apparatus FE for fusing environment information from at least two environment sensors U1, U2 of a motor vehicle. The fusion apparatus FE is in this case configured so as to receive a circumstance variable that is characteristic of a circumstance relating to the driving situation.

The circumstance variable is in particular a variable determined by a sensor G, for example a variable characteristic of the brightness of the vehicle environment.

The fusion apparatus FE is furthermore configured so as to determine at least one influencing variable g1, g2 characteristic of an influence of an environment sensor on the fusion on the basis of the circumstance variable.

In particular when the fusion apparatus FE fuses the environment information from the environment sensors U1, U2 by way of a linear combination, the influencing variables g1, g2 may in each case be a weighting factor assigned to an environment sensor U1, U2.

The fusion apparatus FE fuses environment information from the environment sensors U1, U2 on the basis of the influencing variable g1, g2 and provides the fused environment information vm to a driver assistance system FAS contained within the motor vehicle.

The fusion apparatus FE is in this case configured so as to determine the influencing variable g1, g2 on the basis of a relationship between the circumstance variable and a functional quality of at least one environment sensor U1, U2.

In particular, when one of the environment sensors U1, U2 is a camera-based sensor, the influence of the environment information from this environment sensor U1 on the fused environment information vm may be relatively low when the circumstance variable indicates low brightness of the vehicle environment.

The fusion apparatus FE is furthermore configured so as to interpret the fused environment information vm before providing it to the driver assistance system FAS on the basis of an assistive variable.

The assistive variable may in this case for example be read from an assistive variable storage unit H that is contained within the fusion apparatus FE.

The fusion apparatus FE may in this case for example interpret the fused environment information vm on the basis of a movement of an object recorded by the environment sensors U1, U2.

As an alternative thereto, the fusion apparatus FE may for example interpret the fused environment information vm on the basis of a behavioral model of an object recorded by the environment sensors U1, U2.

As an alternative thereto, the fusion apparatus FE may interpret the fused environment information vm as an assistive variable on the basis of a traffic rule.

Figure 1B:
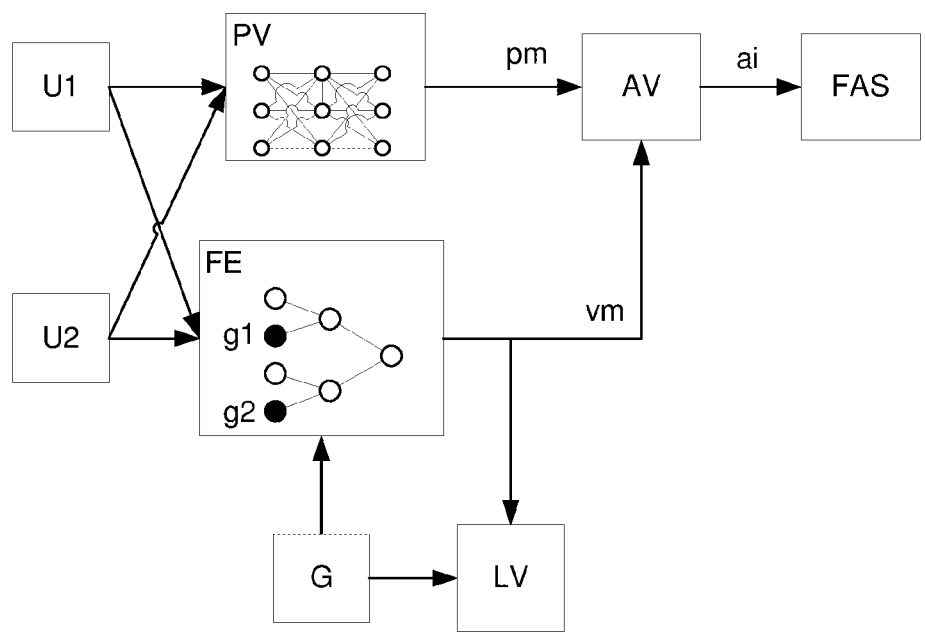
FIG. 1b shows an exemplary embodiment of a fusion system according to the invention.

FIG. 1b shows a fusion system for a motor vehicle, wherein the fusion system comprises at least two environment sensors U1, U2, a neural network PV coupled to the environment sensors U1, U2 for fusing environment information from the environment sensors U1, U2, a fusion apparatus FE according to the invention for fusing environment information from the environment sensors U1, U2, and a control device AV coupled to the fusion apparatus FE and to the neural network PV.

The control device AV is in this case configured so as to adapt the environment information pm fused by the neural network PV on the basis of environment information vm fused by the fusion apparatus FE, and to provide the adapted environment information ai to a driver assistance system FAS of the motor vehicle.

By way of example, the control device AV may make a selection, on the basis of the environment information vm fused by the fusion apparatus FE, as to whether the environment information pm fused by the neural network PV or the environment information vm fused by the fusion apparatus FE is provided to the driver assistance system FAS.

As an alternative thereto, the control device AV may interpret the environment information pm fused by the neural network PV on the basis of the environment information vm fused by the fusion apparatus FE, and provide the interpretation result to the driver assistance system FAS.

If for example the fused environment information pm, vm in each case relates to a spatial region in which an object is located with a sufficiently high probability, then the control device AV may combine the two spatial regions with one another and provide the combination result to the driver assistance system FAS.

The fusion system furthermore comprises a recording device LV coupled to the fusion apparatus FE. The recording device LV is configured so as to store, for linked environment information vm provided by the fusion apparatus FE, at least one circumstance variable that is characteristic of a circumstance relating to the driving situation and/or at least one influencing variable g1, g2 determined on the basis of the circumstance variable and characteristic of an influence of an environment sensor on the fusion.

Figure 2:
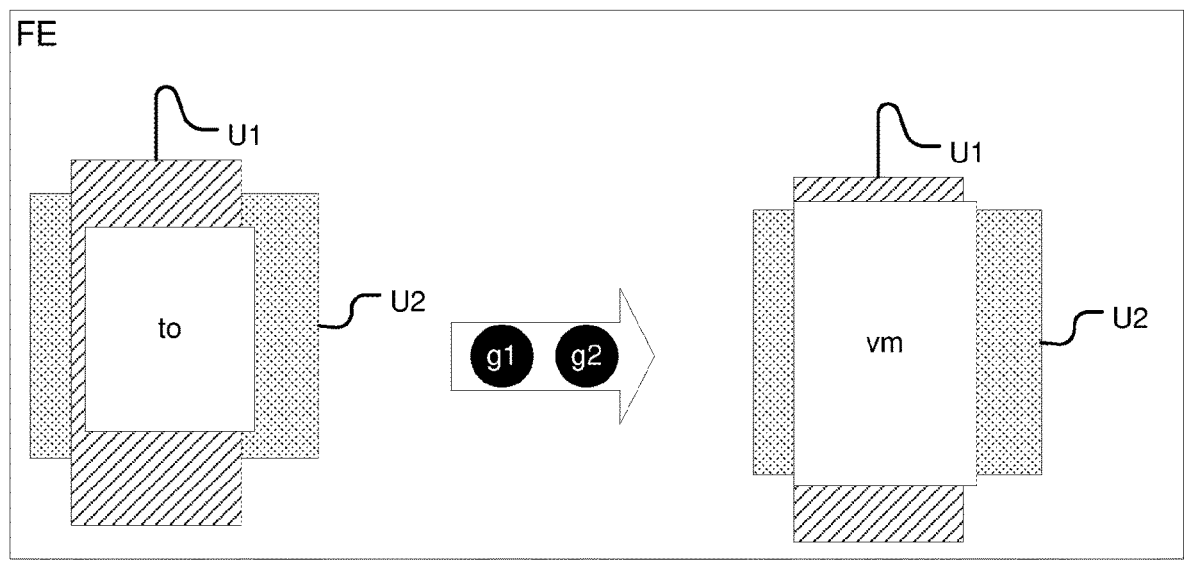
FIG. 2 shows an exemplary embodiment of a fusion method according to the invention.

FIG. 2 shows an exemplary embodiment of a fusion method according to the invention.

In this case, the spatial region to in which an object is actually located is recorded by the environment sensors U1, U2. Due to an extremely wide variety of circumstances, the environment sensors U1, U2 do not normally record the exact spatial region in which the object is located.

The fusion apparatus FE is therefore configured so as to fuse environment information from the environment sensors U1, U2. To this end, the fusion apparatus FE receives a circumstance variable that is characteristic of a circumstance relating to the driving situation. On the basis of the circumstance variable, the fusion apparatus FE determines at least one influencing variable g1, g2 characteristic of an influence of an environment sensor on the fusion.

The environment information from the environment sensors U1, U2 is then fused by the fusion apparatus FE on the basis of the influencing variable g1, g2. The fused environment information vm in this case reproduces the spatial region in which the object is located with a higher quality than the environment information from an individual environment sensor U1, U2.

What is claimed is:

1. A fusion system for a motor vehicle, comprising:
   at least two environment sensors;
   a neural network coupled to the environment sensors for fusing environment information from the environment sensors;
   a fusion apparatus coupled to the environment sensors for fusing environment information from the environment sensors;
   a recording device coupled to the fusion apparatus, wherein the recording device is configured so as to store a circumstance variable that is characteristic of a circumstance relating to a driving situation; and
   a control device coupled to the fusion apparatus and to the neural network, wherein the fusion apparatus is configured so as to:
      receive the circumstance variable that is characteristic of the circumstance relating to the driving situation from the recording device,
      determine an influencing variable characteristic of an influence of a first environment sensor of the environment sensors on the fusion on the basis of the circumstance variable, and
      fuse the environment information from the environment sensors on the basis of the influencing variable, and
   the control device is configured so as to:
      adapt the environment information fused by the neural network on the basis of the environment information fused by the fusion apparatus, and
      provide the adapted environment information to a driver assistance system of the motor vehicle.

2. The fusion system according to claim 1, wherein the fusion apparatus is configured so as to determine the influencing variable on the basis of a relationship between the circumstance variable and a functional quality of the first environment sensor of the environment sensors.

3. The fusion system according to claim 1, wherein the fusion apparatus is configured so as to interpret the fused environment information on the basis of an assistive variable.

4. The fusion system according to claim 3, wherein the fusion apparatus is configured so as to interpret the fused environment information as an assistive variable on the basis of a movement of an object recorded by the environment sensors.

5. The fusion system according to claim 4, wherein the fusion apparatus is configured so as to interpret the fused environment information as an assistive variable on the basis of a behavioral model of an object recorded by the environment sensors.

6. The fusion system according to claim 5, wherein the fusion apparatus is configured so as to interpret the fused environment information as an assistive variable on the basis of a traffic rule.

7. The fusion system according to claim 3, wherein the fusion apparatus is configured so as to interpret the fused environment information as an assistive variable on the basis of a behavioral model of an object recorded by the environment sensors.

8. The fusion system according to claim 3, wherein the fusion apparatus is configured so as to interpret the fused environment information as an assistive variable on the basis of a traffic rule.

9. The fusion system according to claim 1, wherein the influencing variable is a weighting factor that is assigned to the first environment sensor of the environment sensors.

* * * * *